Patented Oct. 14, 1924.

1,511,494

UNITED STATES PATENT OFFICE.

GUSTAV BAUM, OF CARINTHIA, AUSTRIA, ASSIGNOR TO THE FIRM OF CHEMISCHE FABRIK WEISSENSTEIN G. M. B. H., OF CARINTHIA. AUSTRIA.

PROCESS FOR MAKING OR CONCENTRATING HYDROGEN PEROXIDE.

No Drawing.    Application filed August 22, 1922. Serial No. 583,666.

*To all whom it may concern:*

Be it known that I, GUSTAV BAUM, a citizen of the Republic of Austria, and residing at Weissenstein ob der Drau, Carinthia, in the Republic of Austria, have invented certain new and useful Improvements in Processes for Making or Concentrating Hydrogen Peroxide; and I do hereby declare the following to be a full, clear, and exact description of the invention, such as will enable others skilled in the art to which it appertains to make and use the same.

An important consideration in the art of distilling or concentrating hydrogen peroxide is the material which is to be used for the apparatus required for the purpose. Scientific and technical knowledge has hitherto excluded metals for the purpose, so that recourse has been had to materials such as earthenware, glass, quartz and the like, which are but poor conductors of heat and are, moreover, open to the usual wellknown objections.

The present invention is based on the observation that substances which contain hydrogen peroxide, either in the free form or in the latent form, are not affected catalytically by contact with tantalum, even at a high temperature, when they are of acid or neutral reaction.

According to the invention, therefore, vessels which are to be used for distilling, condensing or concentrating hydrogen peroxide, or materials containing it, as aforesaid, are made of tantalum which conducts heat well and is both mechanically and chemically a metal of high resistance.

For example, persulphuric acid or acid ammonium persulphate solution may be evaporated in pipes or retorts constructed of tantalum, and the hydrogen peroxide obtained may be condensed in tantalum condensers, or the water may be expelled almost without loss from dilute hydrogen peroxide solutions, for instance of 8 per cent strength, in a tantalum vessel, so that the concentrated liquid may contain 40 per cent or over of hydrogen peroxide.

What I claim is—

The process of making or concentrating hydrogen peroxide, which consists in evaporating a per-sulphuric compound and in condensing the vapors of hydrogen peroxide formed therefrom in vessels of tantalum, said metal being inert and non-catalytic with respect to said per-compounds.

In testimony that I claim the foregoing as my invention, I have signed my name.

GUSTAV BAUM.

Witnesses:
INGCHEM J. RUMPLER,
INGR. ED. GROSS.